US010462529B2

United States Patent
Xu et al.

(10) Patent No.: US 10,462,529 B2
(45) Date of Patent: Oct. 29, 2019

(54) MULTICAST TRANSMISSION METHOD, APPARATUS AND SYSTEM FOR OTT MEDIA

(71) Applicant: ZTE Corporation, Shenzhen (CN)

(72) Inventors: Kaibo Xu, Shenzhen (CN); Xingchang Zhu, Shenzhen (CN); Yingchuan Chen, Shenzhen (CN)

(73) Assignee: XI'AN ZHONGXING NEW SOFTWARE CO., LTD., Shaanxi (CN)

( * ) Notice: Subject to any disclaimer, the term of this patent is extended or adjusted under 35 U.S.C. 154(b) by 0 days.

(21) Appl. No.: 15/741,243

(22) PCT Filed: May 27, 2016

(86) PCT No.: PCT/CN2016/083682
§ 371 (c)(1),
(2) Date: Dec. 30, 2017

(87) PCT Pub. No.: WO2017/000720
PCT Pub. Date: Jan. 5, 2017

(65) Prior Publication Data
US 2018/0192156 A1    Jul. 5, 2018

(30) Foreign Application Priority Data
Jul. 2, 2015 (CN) .......................... 2015 1 0382644

(51) Int. Cl.
*H04N 7/16* (2011.01)
*H04N 21/6405* (2011.01)
(Continued)

(52) U.S. Cl.
CPC ....... *H04N 21/6405* (2013.01); *H04N 21/235* (2013.01); *H04N 21/2343* (2013.01);
(Continued)

(58) Field of Classification Search
None
See application file for complete search history.

(56) References Cited

U.S. PATENT DOCUMENTS

| 6,820,133 B1* | 11/2004 | Grove ............... H04L 29/12066 |
|---|---|---|
| | | 709/238 |
| 2011/0047569 A1* | 2/2011 | Mears .................. H04N 5/4401 |
| | | 725/39 |

(Continued)

FOREIGN PATENT DOCUMENTS

| CN | 1859562 A | 11/2006 |
|---|---|---|
| CN | 102292959 A | 12/2011 |
| CN | 105049954 A | 11/2015 |

OTHER PUBLICATIONS

Supplementary European Search Report Application No. EP16817084 dated Jun. 8, 2018, pp. 9.

(Continued)

*Primary Examiner* — William J Kim
(74) *Attorney, Agent, or Firm* — Cantor Colburn LLP

(57) ABSTRACT

A multicast transmission method for OTT media is provided. According to the method, a terminal sends media description request information corresponding to OTT media to a multicast server; the terminal receives media description information fed back by the multicast server based on the media description request information, wherein the media description information may include multicast information, and the multicast information may include multicast group information; and the terminal receives, according to the multicast group information, a multicast packet from the multicast server, wherein the multicast packet is generated by encapsulating a media index file corresponding to the media description request information and/or a media content file corresponding to the media description request information.

18 Claims, 7 Drawing Sheets

(51) Int. Cl.
*H04N 21/235* (2011.01)
*H04N 21/654* (2011.01)
*H04N 21/2343* (2011.01)
*H04N 21/845* (2011.01)
*H04N 21/8543* (2011.01)

(52) U.S. Cl.
CPC ....... *H04N 21/654* (2013.01); *H04N 21/8456* (2013.01); *H04N 21/8543* (2013.01)

(56) References Cited

U.S. PATENT DOCUMENTS

2012/0198506 A1* 8/2012 Joe .................. H04N 21/44209
725/97
2012/0301108 A1* 11/2012 Zetterower ............ H04N 5/782
386/241
2013/0132986 A1 5/2013 Mack et al.
2014/0019587 A1 1/2014 Giladi
2014/0372624 A1 12/2014 Wang et al.
2015/0030022 A1* 1/2015 Mantin ................... H04L 65/80
370/390
2015/0046568 A1 2/2015 Mantin
2018/0077431 A1* 3/2018 Wei ........................ H04L 12/18

OTHER PUBLICATIONS

International Search Report dated Jul. 26, 2016 re: Application No. PCT/CN2016/083682; pp. 1-2; citing: CN 105049954 A, CN 1859562 A, CN 102292959 A, US 2015046568 A1 and US 2013132986 A1.

* cited by examiner

MULTICAST TRANSMISSION METHOD, APPARATUS AND SYSTEM FOR OTT MEDIA

TECHNICAL FIELD

The disclosure relates to, but is not limited to, the field of communications, and in particular to a multicast transmission method, apparatus and system for Over The Top (OTT) media.

BACKGROUND

With the rise of the mobile internet, OTT media services has developed rapidly, and performing the transmission and the playing of video streams based on file downloading has become a solution adopted by most of video websites.

A Hypertext Transfer Protocol (HTTP) Live Streaming (HLS) protocol is widely used. According to the HLS protocol, a media stream may be converted into a media index file and a plurality of media fragmentation files in a slicing manner. In a video-on-demand process, a player terminal may request the media index file using the HTTP, parse out addresses of the media fragmentation files, download the media fragmentation files through the HTTP, and play the media fragmentation files. In a live streaming process, fragmentation file information may also be regularly updated into a media index file, a player terminal may pull the index file circularly to acquire updated media file address information, and then pull updated fragmentation files to realize a live stream.

In the foregoing transmission modes, each terminal player may need to establish a plurality of short links with a server, and a process of establishing a link, downloading a file and releasing the link has to be separately carried out for each media index file and each media fragmentation file, reducing the performance of the server tremendously. To guarantee a reliable viewing quality, the service provider may need to deploy a great number of media servers and distributed networks, leading to a huge investment.

No effective solutions have been proposed to address a problem that the transmission of media streams tremendously consumes resources of a server.

SUMMARY

Below is a summary of the subject matter described in the disclosure in detail. The summary is not provided to limit the scope of protection of appended claims.

A multicast transmission method, apparatus and system for OTT media are provided, which may at least address a problem that transmission of media streams consumes resources of a server tremendously.

A multicast transmission method for OTT media is provided in an embodiment of the disclosure. The multicast transmission method for OTT media may include acts, which are described as follows.

A terminal may send media description request information corresponding to OTT media to a multicast server.

The terminal may receive media description information fed back by the multicast server based on the media description request information. In the embodiment, the media description information includes multicast information, and the multicast information includes multicast group information.

The terminal may receive, according to the multicast group information, a multicast packet from the multicast server. In the embodiment, the multicast packet may be generated by encapsulating a media index file corresponding to the media description request information and/or a media content file corresponding to the media description request information.

In an exemplary embodiment, the media description information may include at least one of a media index file address and a media content file address.

The method may further include the following acts.

After joining a multicast group specified by the multicast information, the terminal may modify the media index file address and/or the media content file address to be a local address of the terminal.

The terminal may direct the media index file of the multicast packet to a local media index file according to the local address, and/or the terminal may direct the media content file to a local media content file according to the local address.

In an exemplary embodiment, the method may further include the following act.

When being incapable of normally receiving the multicast packet from the multicast server according to the multicast group information, the terminal may acquire, from a media server corresponding to the media description request information, the media index file and/or the media content file corresponding to the multicast packet.

In an exemplary embodiment, the multicast packet may be generated by encapsulating the media content file partitioned according to a preset fragmentation size threshold.

In an exemplary embodiment, the media index file may include a sequential relationship among media content files.

A multicast transmission method for OTT media is also provided in an embodiment of the disclosure, including the following acts.

A multicast server may receive media description request information corresponding to OTT media from a terminal.

The multicast server may send media description information corresponding to the media description request information to the terminal. In the embodiment, the media description information may include multicast information, and the multicast information may include multicast group information.

The multicast server may send a multicast packet to the terminal, which exists in the multicast group information. In the embodiment, the multicast packet may be generated by encapsulating a media index file corresponding to the media description request information and/or a media content file corresponding to the media description request information.

In an exemplary embodiment, before the multicast server sends the multicast packet to the terminal, which exists in the multicast group information, the method may further include the following act.

The media index file and/or the media content file may be acquired from a media server according to the media description request information.

In an exemplary embodiment, the multicast packet may be generated by encapsulating the media content file partitioned according to a preset fragmentation size threshold.

In an exemplary embodiment, the media index file may include a sequential relationship among media content files.

In an embodiment of the disclosure, a computer-readable storage medium is provided. Computer-executable instructions which, when being executed, may realize the foregoing multicast transmission method for OTT media may be stored on the computer-readable storage medium.

A multicast transmission apparatus for OTT media is also provided in an embodiment of the disclosure. The multicast transmission apparatus for OTT media may be located in a terminal and may include a first sending module, a first receiving module and a second receiving module.

The first sending module may be configured to send media description request information corresponding to OTT media to a multicast server.

The first receiving module may be configured to receive media description information fed back by the multicast server based on the media description request information. In the embodiment, the media description information may include multicast information, and the multicast information may include multicast group information.

The second receiving module may be configured to receive, according to the multicast group information, a multicast packet from the multicast server. In the embodiment, the multicast packet may be generated by encapsulating a media index file corresponding to the media description request information and/or a media content file corresponding to the media description request information.

A multicast transmission apparatus for OTT media is also provided in an embodiment of the disclosure. The multicast transmission apparatus for OTT media may be located in a multicast server and may include a third receiving module, a second sending module and a third sending module.

The third receiving module may be configured to receive the media description request information corresponding to OTT media from a terminal.

The second sending module may be configured to send media description information corresponding to the media description request information to the terminal. In the embodiment, the media description information may include multicast information, and the multicast information may include multicast group information.

The third sending module may be configured to send a multicast packet to the terminal, which exists in the multicast group information. In the embodiment, the multicast packet may be generated by encapsulating a media index file corresponding to the media description request information and/or a media content file corresponding to the media description request information.

A multicast transmission system for OTT media, including a terminal and a multicast server, is also provided in an embodiment of the disclosure.

The terminal may be configured to send media description request information corresponding to OTT media to the multicast server.

The terminal may be configured to receive media description information fed back by the multicast server based on the media description request information. In the embodiment, the media description information may include multicast information, and the multicast information may include multicast group information.

The multicast server may be configured to send a multicast packet to the terminal, which exists in the multicast group information. In the embodiment, the multicast packet may be generated by encapsulating a media index file corresponding to the media description request information and/or a media content file corresponding to the media description request information.

The terminal may be configured to receive, according to the multicast group information, the multicast packet from the multicast server.

In some embodiments of the disclosure, a terminal may send media description request information corresponding to OTT media to a multicast server, the terminal may receive media description information fed back by the multicast server based on the media description request information, wherein the media description information may include multicast information, and the multicast information may include multicast group information, and the terminal may receive a multicast packet from the multicast server according to the multicast group information, wherein the multicast packet may be generated by encapsulating a media index file corresponding to the media description request information and/or a media content file corresponding to the media description request information. By virtue of the solution, a problem that transmission of media streams consumes resources of a server tremendously may be addressed and the resource consumption of the server may be lowered.

Other aspects of the disclosure can be understood by reading and appreciating accompanying drawings and a detailed description.

DETAILED DESCRIPTION OF THE EMBODIMENTS

Implementation modes of the disclosure are described below with reference to accompanying drawings. It should be noted that the embodiments of the disclosure and the features thereof can be combined with each other if no conflict is caused.

It should be noted that the terms 'first' and 'second', as used hereinafter, are used to distinguish among similar objects but not necessarily indicate a specific sequence or a precedence order.

Figure 1:
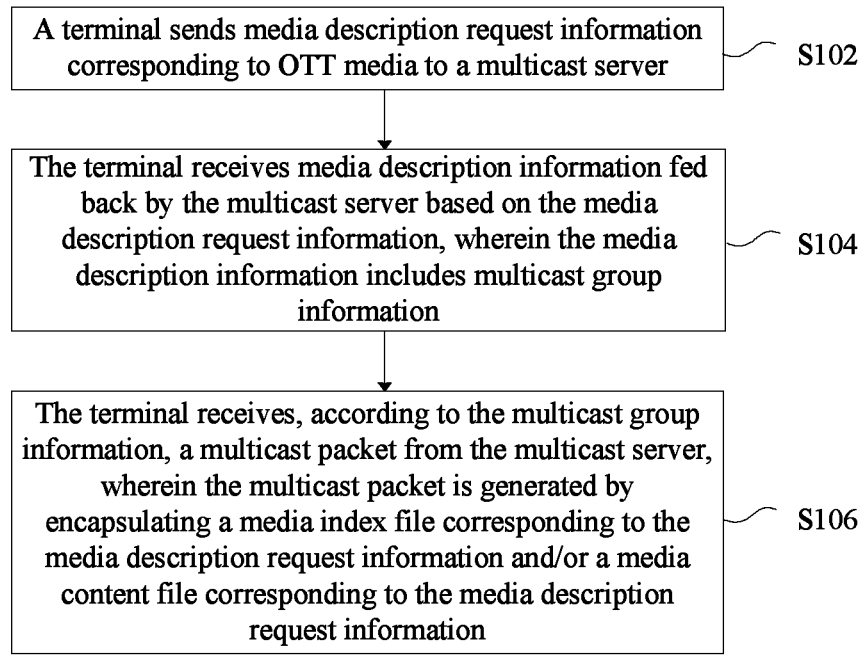
FIG. 1 is a flow chart illustrating a multicast transmission method for OTT media according to an embodiment of the disclosure.

A multicast transmission method for OTT media is provided in an embodiment. FIG. 1 is a flow chart schematically illustrating a multicast transmission method for OTT media according to an embodiment of the disclosure. As shown in FIG. 1, the method may include acts S102 to S106.

At act S102, a terminal may send media description request information corresponding to OTT media to a multicast server.

At act S104, the terminal may receive media description information fed back by the multicast server based on the media description request information. In the embodiment, the media description information may include multicast information, and the multicast information may include multicast group information.

At act S106, the terminal may receive, according to the multicast group information, a multicast packet from the multicast server. In the embodiment, the multicast packet may be generated by encapsulating a media index file corresponding to the media description request information and/or a media content file corresponding to the media description request information.

According to the above acts, a terminal may send media description request information corresponding to OTT media to a multicast server. The terminal may receive media description information fed back by the multicast server based on the media description request information, the media description information may include multicast information, and the multicast information may include multicast group information. The terminal may receive a multicast packet from the multicast server according to the multicast group information, where the multicast packet may be generated by encapsulating a media index file corresponding to the media description request information and/or a media content file corresponding to the media description request information. By virtue of the solution, a problem that transmission of media streams consumes resources of a server tremendously may be addressed, and the resource consumption of the server may be lowered.

In some embodiments of the disclosure, the media description information may include at least one of a media index file address and a media content file address.

The method may further include the following acts.

After joining a multicast group specified by the multicast information, the terminal may modify the media index file address and/or the media content file address to be a local address of the terminal.

The terminal may direct the media index file of the multicast packet to a local media index file according to the local address, and/or the terminal may direct the media content file to a local media content file according to the local address.

In some embodiments of the disclosure, the method may further include the following act.

When being incapable of normally receiving the multicast packet from the multicast server according to the multicast group information, the terminal may acquire, from a media server corresponding to the media description request information, the media index file and/or the media content file corresponding to the multicast packet.

In some embodiments of the disclosure, the multicast packet may be generated by encapsulating the media content file partitioned according to a preset fragmentation size threshold.

In some embodiments of the disclosure, the media index file may include a sequential relationship among media content files.

Figure 2:
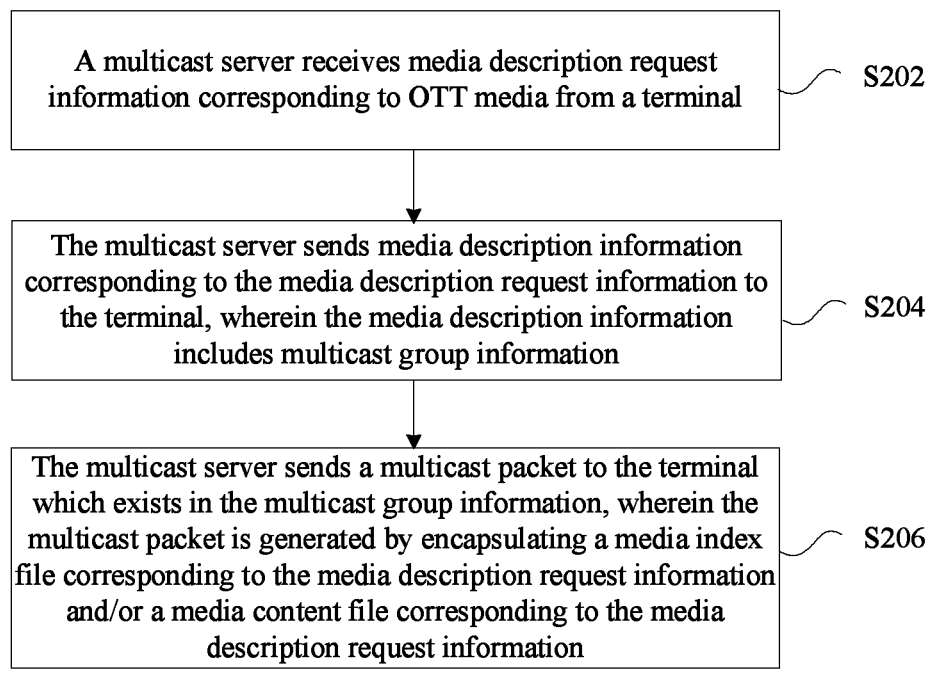
FIG. 2 is a flow chart illustrating another multicast transmission method for OTT media according to an embodiment of the disclosure.

Another multicast transmission method for OTT media is also provided in the embodiment. FIG. 2 is a flow chart illustrating another multicast transmission method for OTT media according to an embodiment of the disclosure. As shown in FIG. 2, the method may include acts S202 to S206.

At act S202, a multicast server may receive media description request information corresponding to OTT media from a terminal.

At act S204, the multicast server may send media description information corresponding to the media description request information to the terminal. In the embodiment, the media description information may include multicast information, and the multicast information may include multicast group information.

At act S206, the multicast server may send a multicast packet to the terminal, which exists in the multicast group information. In the embodiment, the multicast packet may be generated by encapsulating a media index file corresponding to the media description request information and/or a media content file corresponding to the media description request information.

According to the above acts, a multicast server may receive the media description request information corresponding to OTT media from a terminal. The multicast server may send media description information corresponding to the media description request information to the terminal, the media description information may include multicast information, and the multicast information may include multicast group information. The multicast server may send a multicast packet to the terminal, which exists in the multicast group information, where the multicast packet may be generated by encapsulating a media index file corresponding to the media description request information and/or a media content file corresponding to the request media description information. By virtue of the solution, a problem that transmission of media streams consumes resources of a server tremendously may be addressed, and the resource consumption of the server may be lowered.

In the embodiment, the terminal, which exists in the multicast group information, may refer to a terminal in a multicast group to which the multicast group information belongs.

In some embodiments of the disclosure, before the multicast server sends the multicast packet to the terminal, which exists in the multicast group information, the method may further include the following act.

The media index file and/or the media content file may be acquired from a media server according to the media description request information.

In some embodiments of the disclosure, the multicast packet may be generated by encapsulating the media content file partitioned according to a preset fragmentation size threshold.

In some embodiments of the disclosure, the media index file may include a sequential relationship among media content files.

In an embodiment of the disclosure, a computer-readable storage medium is provided. Computer-executable instructions which, when being executed, may realize the foregoing multicast transmission method for OTT media may be stored on the computer-readable storage medium.

A multicast transmission apparatus for OTT media is also provided in the embodiment. The multicast transmission apparatus for OTT media is configured to realize the foregoing embodiments, and what has been described above is not described here repeatedly. The term 'module', as used hereinafter, is a combination of pieces of software and/or hardware for realizing preset functions. Although optionally embodied as pieces of software, the apparatuses described in the following embodiments may also be devised to be embodied as pieces of hardware or a combination of pieces of software and hardware.

Figure 3:
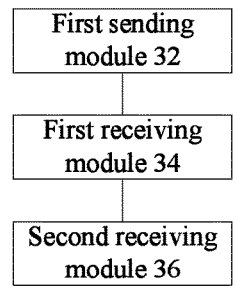
FIG. 3 is a block diagram illustrating the structure of a multicast transmission apparatus for OTT media according to an embodiment of the disclosure.

FIG. 3 is a block diagram illustrating the structure of a multicast transmission apparatus for OTT media according to an embodiment of the disclosure. As shown in FIG. 3, a multicast transmission apparatus for OTT media provided in an embodiment of the disclosure may include a first sending module 32, a first receiving module 34 and a second receiving module 36.

The first sending module 32 may be configured to send media description request information corresponding to OTT media to a multicast server.

The first receiving module 34 may be configured to receive media description information fed back by the multicast server based on the media description request information. In the embodiment, the media description information may include multicast information, and the multicast information may include multicast group information.

The second receiving module 36 may be configured to receive, according to the multicast group information, a multicast packet from the multicast server. In the embodiment, the multicast packet may be generated by encapsulating a media index file corresponding to the media description request information and/or a media content file corresponding to the media description request information.

Through the foregoing apparatus, a terminal may send media description request information corresponding to OTT media to a multicast server. The terminal may receive media description information fed back by the multicast server based on the media description request information, the media description information may include multicast information, and the multicast information may include multicast group information. The terminal may receive a multicast packet from the multicast server according to the multicast group information, and the multicast packet may be generated by encapsulating a media index file corresponding to the media description request information and/or a media content file corresponding to the media description request information. By virtue of the solution, a problem that transmission of media streams consumes resources of a server tremendously may be addressed and the resource consumption of the server may be lowered.

Figure 4:
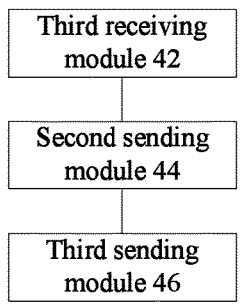
FIG. 4 is a block diagram illustrating the structure of another multicast transmission apparatus for OTT media according to an embodiment of the disclosure.

FIG. 4 is a block diagram illustrating the structure of another multicast transmission apparatus for OTT media according to an embodiment of the disclosure. As shown in FIG. 4, another multicast transmission apparatus for OTT media provided in an embodiment of the disclosure may include a third receiving module 42, a second sending module 44 and a third sending module 46.

The third receiving module 42 may be configured to receive the media description request information corresponding to OTT media from a terminal.

The second sending module 44 may be configured to send media description information corresponding to the media description request information to the terminal. In the embodiment, the media description information may include multicast information, and the multicast information may include multicast group information.

The third sending module 46 may be configured to send a multicast packet to the terminal, which exists in the multicast group information. In the embodiment, the multicast packet may be generated by encapsulating a media index file corresponding to the media description request information and/or a media content file corresponding to the media description request information.

Through the foregoing acts, a multicast server may receive the media description request information corresponding to OTT media from a terminal. The multicast server may send media description information corresponding to the media description request information to the terminal, the media description information may include multicast information, and the multicast information may include multicast group information. The multicast server may send a multicast packet to the terminal, which exists in the multicast group information, and the multicast packet may be generated by encapsulating a media index file corresponding to the media description request information and/or a media content file corresponding to the media description request information. By virtue of the solution, a problem that transmission of media streams consumes resources of a server tremendously may be addressed and the resource consumption of the server may be lowered.

In an embodiment of the disclosure, a multicast transmission system for OTT media is also provided, including a terminal and a multicast server.

The terminal may send media description request information corresponding to OTT media to the multicast server.

The terminal may receive media description information fed back by the multicast server in response to the media description request information. In the embodiment, the media description information may include multicast information, and the multicast information may include multicast group information.

the multicast server may send a multicast packet to the terminal, which exists in the multicast group information. In the embodiment, the multicast packet may be generated by encapsulating a media index file corresponding to the media description request information and/or a media content file corresponding to the media description request information.

The terminal may receive, according to the multicast group information, the multicast packet from the multicast server.

Embodiments of the disclosure are described below in detail with reference to an optional implementation mode thereof.

In an exemplary implementation mode, a method of transmitting a media index and a media file using a multicast technology is provided, so that the resource consumption of a server can be lowered remarkably.

A multicast transmission technology can achieve a one-to-many network connection between a sender and each receiver, thus, the sender only needs to copy one identical packet when transmitting identical data to a plurality of receivers. Multicast technology improves the transmission efficiency of such a one-to-many data sending and therefore avoids the deployment of a great number of distributed media servers and consequentially lowers investment. Further, the apparatuses provided in some embodiments of the disclosure can be deployed on a media server or a terminal as pieces of middleware without impairing existing server and terminal, thus protecting previous investments.

A method and a system for transmitting OTT media content via multicast are provided in an instance of an exemplary implementation mode. A multicast packing module performs a multicast packing processing on a media index file and a media fragmentation file and transmits a multicast packet. A terminal unpacks the multicast packet into a media index file and a fragment file while a local server is established at the local place of the terminal as a terminal proxy. A simulation media file server provides the unpacked local media index file and the unpacked media content file to a player or a downloading module to realize a play or downloading.

Figure 5:
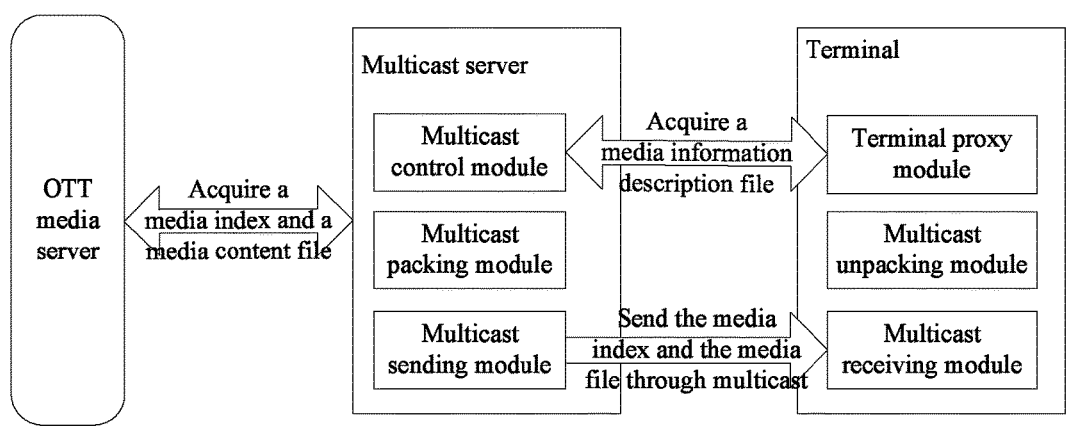
FIG. 5 is a schematic diagram illustrating a multicast transmission system for OTT media according to an optional implementation mode of embodiments of the disclosure.

The system provided in an exemplary embodiment consists of a server side and a terminal side. FIG. 5 is a schematic diagram illustrating a multicast transmission system for OTT media according to an optional implementation mode of embodiments of the disclosure. As shown in FIG. 5, the system may include a multicast control module, a multicast packing module, a multicast sending module, a multicast receiving module, a multicast unpacking module and a terminal proxy module. In the embodiment, the terminal proxy module may be partially identical in function and effect to the second receiving module 36 described in the foregoing embodiment. The multicast sending module may be partially identical in function and effect to the third sending module 46 described in the foregoing embodiment. The specific functions of these modules are described as follows.

The multicast control module may be deployed at the server side and may be configured to generate a media information description file carrying multicast information according to a corresponding OTT media source.

The multicast packing module may be deployed at the server side and may be configured to packet an OTT media index and a media content file that are generated by the media source into a multicast packet.

The multicast sending module may be deployed at the server side as a multicast source for sending an encapsulated multicast packet to a multicast group.

The multicast receiving module may be deployed at the terminal side and may be configured to join a multicast group specified according to the multicast information in the media information description file to receive multicast data.

The multicast unpacking module may be deployed at the terminal side and may be configured to parse the received multicast data into a media index file and a media content file.

The terminal proxy module may be deployed at the terminal side and may be configured to construct a local proxy server to direct a remote media index file and a remote media content file that are requested by a player or a content downloading module to a local index file and a local content file that are generated by the multicast unpacking module.

The modules at the server side may be directly deployed on a media server or independently deployed as separate multicast servers. The modules at the terminal side may be deployed on a terminal (a set top box, a mobile phone, a Personal Assistant Digital (PAD) or a Personal Computer (PC)) as needed. The structure of the system can be understood with reference to FIG. 5.

Figure 6:
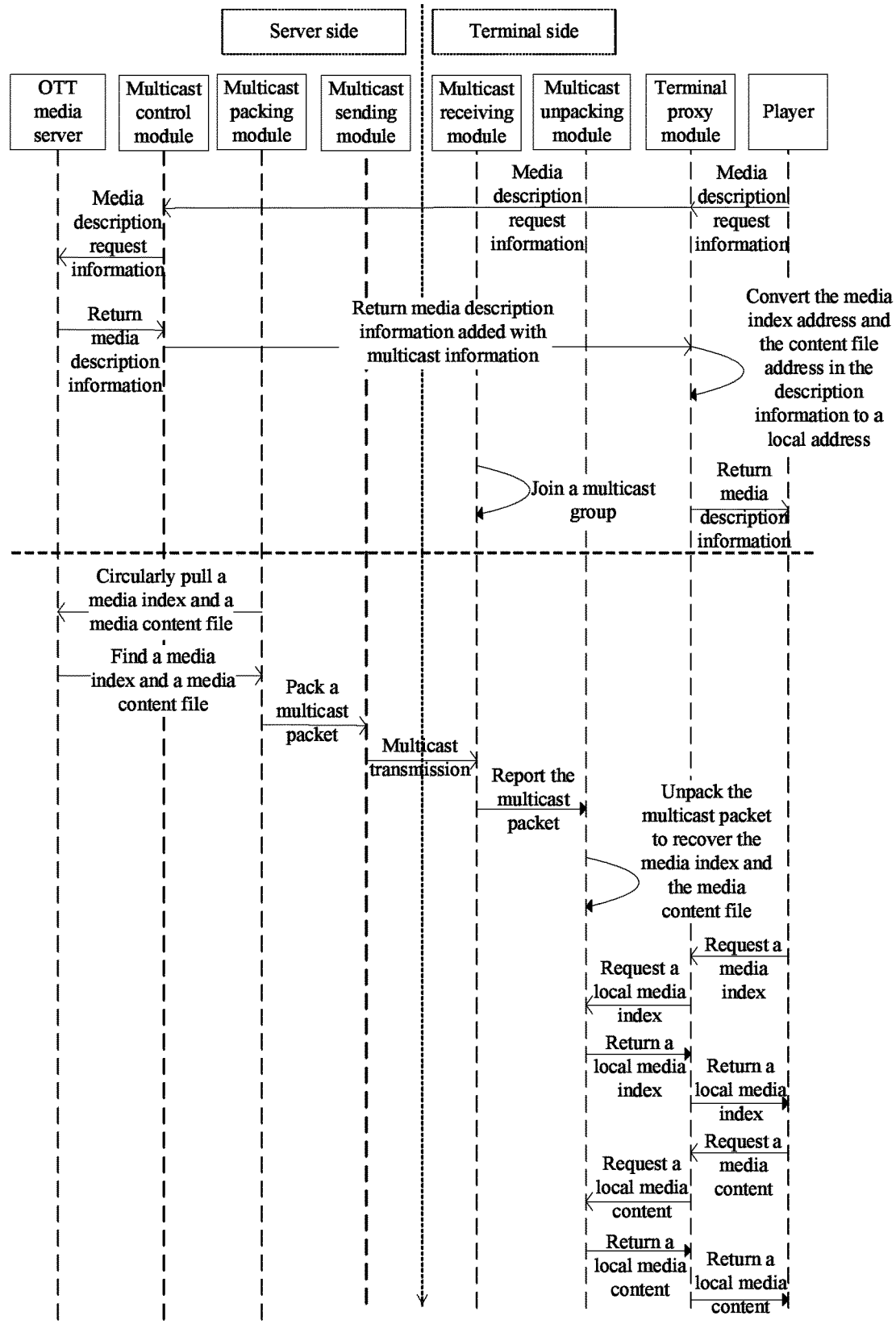
FIG. 6 is a flow chart schematically illustrating a multicast transmission method for OTT media according to an optional implementation mode of embodiments of the disclosure.

FIG. 6 is a flow chart schematically illustrating a multicast transmission method for OTT media according to an optional implementation mode of embodiments of the disclosure. As shown in FIG. 6, the flow may include the following acts.

A terminal player or a downloading module may request a media information description file from a terminal proxy module.

The terminal proxy module may request media description information from a multicast control module on a multicast server.

The multicast control module may acquire corresponding media description information from an OTT media server, add multicast information in the media description information, and return the media description information added with the multicast information to a play proxy module.

The terminal proxy module may convert the server address in the media description information into a local address and return the local address to a player so that the player or a downloading module may convert a request for a media index file and a media content file in the OTT media server into a request for a local proxy.

The terminal proxy module may transfer the multicast information to a multicast receiving module. The multicast receiving module may join a multicast group according to the multicast information.

A multicast packing module may acquire the media index file and the media content file from the OTT media server and pack, according to a format, the files into a multicast packet that can be restored by a receiving terminal.

A multicast sending module may send the packed multicast packet to a corresponding multicast group.

A multicast receiving module may receive the multicast packet and transfer the received multicast packet to a multicast unpacking module.

The multicast unpacking module may restore the multicast packet to the media index file and the media content file.

The player may request the media index file and the media content file.

After receiving the request of the player for the media index file and the media content file, the play proxy may return the corresponding files received by the multicast receiving module to the player to realize a play.

Figure 7:
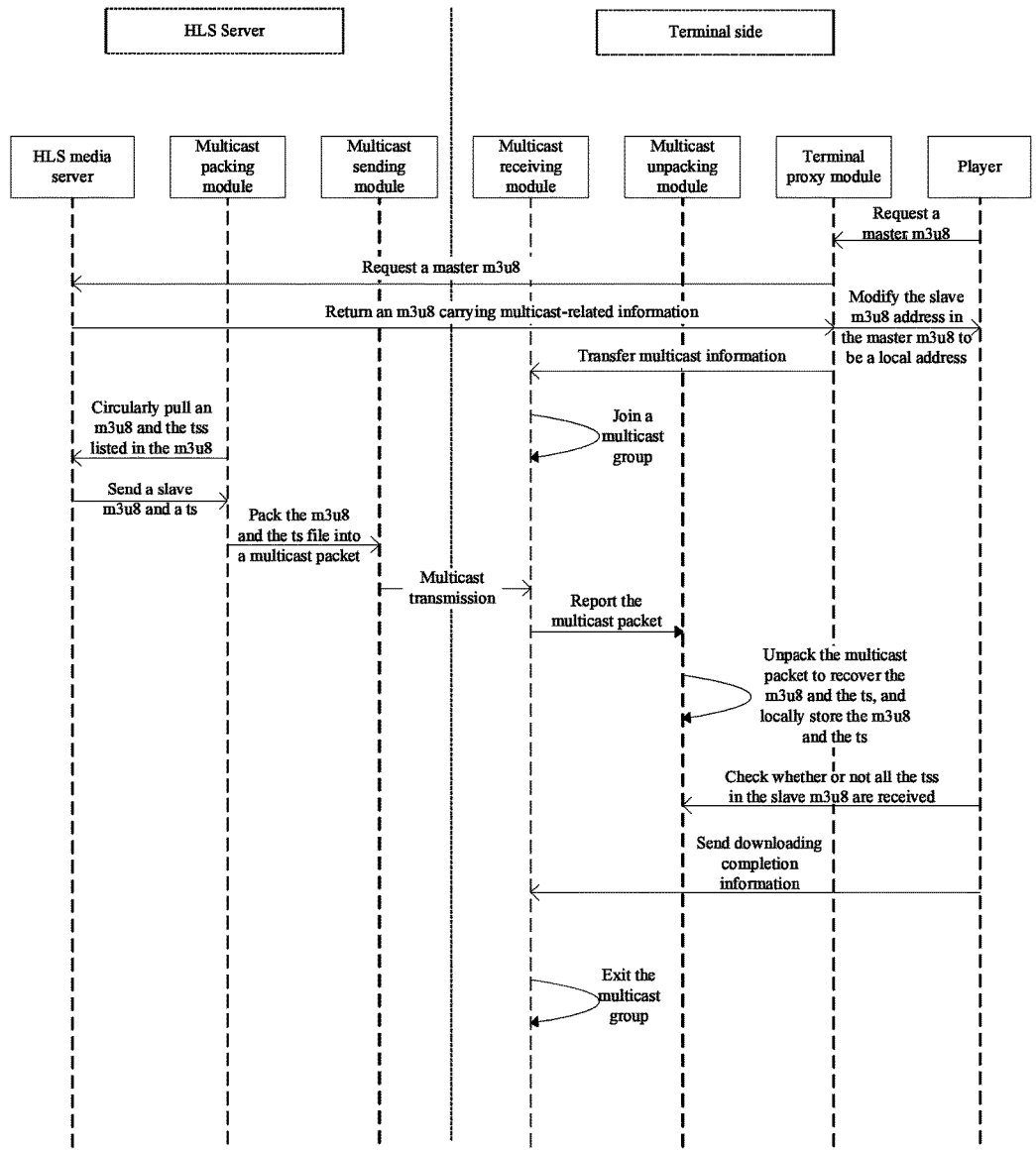
FIG. 7 is a flow chart schematically illustrating the downloading of transmitted code streams of an HLS video-on-demand according to an optional implementation mode of embodiments of the disclosure.

FIG. 7 is a flow chart schematically illustrating the downloading of transmitted code streams of an HLS video-on-demand according to an optional implementation mode of embodiments of the disclosure. As shown in FIG. 7, the flow may include the following acts.

The modules at a server side may be directly deployed on an HLS media server to run as a process, and the modules at a terminal side may be deployed as applications.

A multicast control module on the HLS media server may add multicast information in media description information Session description protocol (SDP) according to a video-on-demand to be sent and a determined multicast group, and synchronously place the SDP information in a master m3u8 (an M3U (a computer file format for a multimedia play list) file in 8-bit Unicode Transformation Format (UTF-8)) encoding format).

A multicast packing module may circularly pull a slave m3u8 and a Transfer Stream (ts) from the HLS server, and encapsulate the slave m3u8 and the ts. In the embodiment, the encapsulation may be the encapsulation of the ts using a Real-time Transport Protocol (RTP). Then the multicast packing module may transfer a packed RTP packet to a multicast sending module.

The multicast sending module may send the RTP packet to a specified multicast group.

A player or a downloading module may request the master m3u8 from a terminal proxy module. The terminal proxy module may request the master m3u8 from a multicast server, and the multicast server may return the master m3u8 carrying the multicast information to the terminal proxy module.

The terminal proxy module may parse out the multicast information, transfer the multicast information to a multicast receiving module and synchronously modify a slave m3u8 address in the master m3u8 to be a local address.

The multicast receiving module may join the multicast group, receive multicast data and transfer the received multicast data to a multicast unpacking module.

The multicast unpacking module may parse the received data according to the format of the RTP packet to recover ts data, and store the recovered data as a local file.

The player or downloading module may check a local m3u8 and a local ts, and notify the multicast receiving module to exit the multicast after confirming that each ts is completed.

Figure 8:
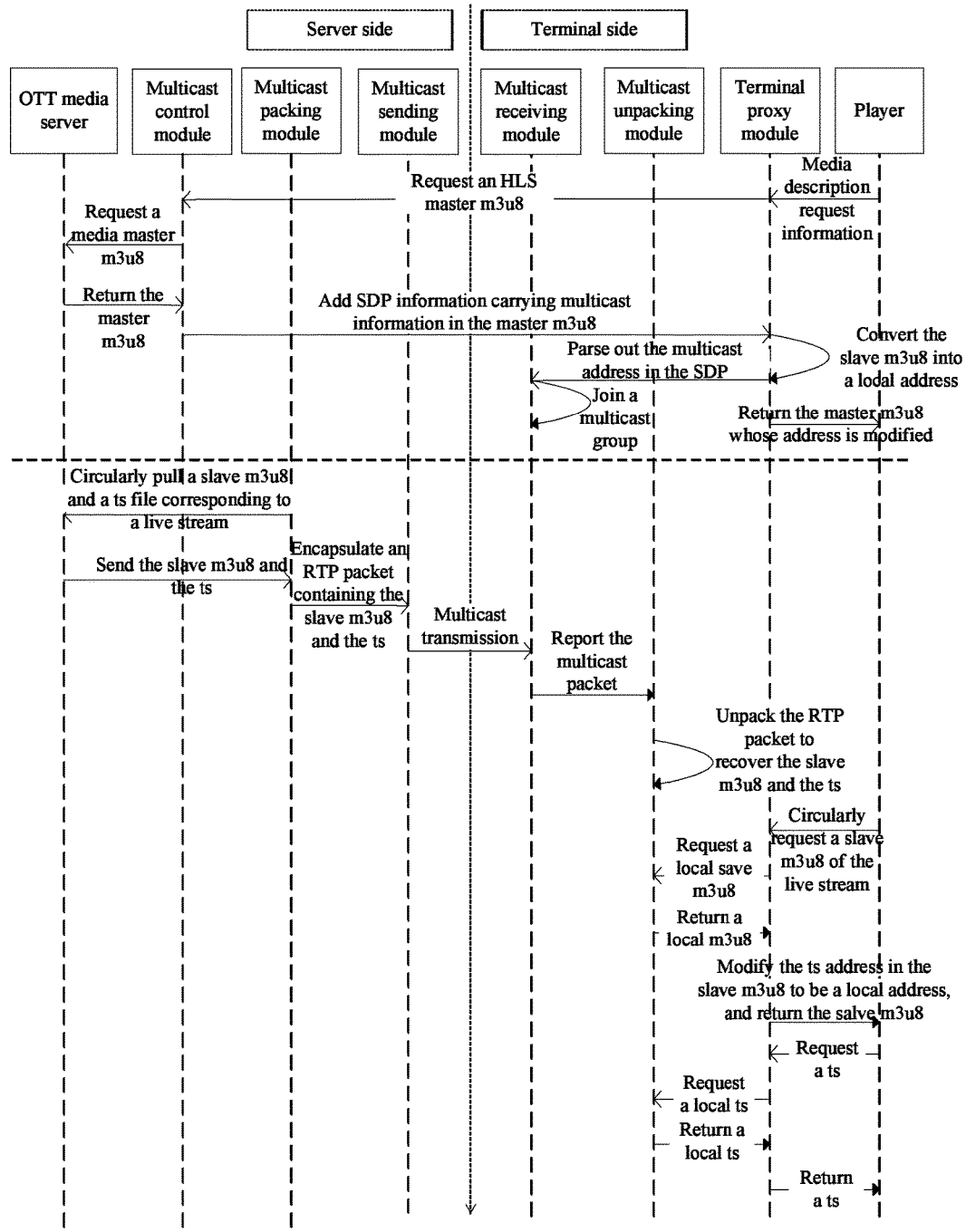
FIG. 8 is a flow chart schematically illustrating the transmission of code streams of an HLS live stream according to an optional implementation mode of embodiments of the disclosure.

FIG. 8 is a flow chart schematically illustrating the transmission of code streams of an HLS live stream according to an optional implementation mode of embodiments of the disclosure. As shown in FIG. 8, because an HLS server updates an m3u8 continuously during live stream to update ts file information, unlike video-on-demand, which only transmits ts through multicast, an updated m3u8 and an updated ts may need to be synchronously encapsulated for live stream. The flow of the implementation of the synchronous encapsulation is described in detail.

The flow at a server side is described as follows.

A multicast control module may add SDP information carrying a multicast address in the master m3u8 of a live stream source according to a planned live stream source and planned multicast information. Specifically, this process may be as follows.

The multicast control module may add the following format information in the master m3u8 to describe the multicast address. The m3u8 format may define that the information starting with # represents annotation information, which will be discarded by a player during a play. However, in an optional implementation mode of embodiments of the disclosure, a play proxy module may add multicast-related information in an annotation, thus avoiding the interference caused by extra information to a player.

An annotation field #GROUPSDP (the SDP of a group) may be added in the master m3u8 to describe media file information.

For example, the media SDP file of a multicast may be as follows:
v=0
o=–0 0 IN IP4 127.0.0.1
c=IN IP4 238.1.1.180
t=0 0
s=gss
m=application 8100 RTP/AVP 96 97
a=rtpmap:96 zteflt/90000
a=rtpmap:97 ztefec/8000
a=fmtp:97 apt=96; fec-encoding-id=1;redundancy-rate=6;group-count=10,repair-window=300

In the above, 238.1.1.180 is a multicast group address whose port is 8100. In order to place an SDP file in a description field of an m3u8, SDP may be converted into the following strings using Base64 (an encoding method for transmitting 8-bit byte codes):
"dj0wCm89LSAwIDAgSU4gSVA0ICAxMjcuMC4w-LjEKYz1JTiBJUDQgMjM4LjEuMS4
xODAKdD0wIDAKcz1nc3MKbT1hcHBsaWNhdGlvbi-A4MTAwIFJUUC9BVIAgOTYgO
TcKYT1ydHBtYXA6OTYgenRIZmx0LzkwMDAw-CmE9cnRwbWFwOjk3IHp0ZWZIYy8   4M
DAwCmE9Zm10cDo5NyBhcHQ9OTY7IGZIYy1Ibm-NvZGluZy1pZD0xO3JIZHVuZ
GFuY3ktcmF0ZT02O2dyb3VwLWNvdW50PTEw-O3JIcGFpci13aW5kb3c9MzAw"

A master m3u8 generated in this way may be as follows:
EXTM3U
GROUPSDP="dj0wCm89LSAwIDAgSU4gSVA0IC-AxMjcuMC4wLjEKYz1JTiBJ
UDQgMjM4LjEuMS4xODAKdD0wIDAKcz1nc3MKb-T1hcHBsaWNhdGlvbiA4MTAwIF
JUUC9BVIAgOTYgOTcKYT1ydHBtYXA6OTYgen-RIZmx0LzkwMDAwCmE9cnRwbW
FwOjk3IHp0ZWZIYy84MDAwCmE9Zm10cDo5Ny-BhcHQ9OTY7IGZIYy1IbmNvZGluZ
y1pZD0xO3JIZHVuZGFuY3ktcmF0ZT02O2dyb3-VwLWNvdW50PTEwO3JIcGFpci13a W5kb3c9MzAw"

. . .
the rest field of the m3u8
. . .

A multicast packing module may continuously pull a slave m3u8 and a ts from the live stream source, encapsulate the slave m3u8 and the ts in an RTP packet, and transfer the encapsulated RTP packet to a multicast sending module.

The multicast sending module may send the RTP packet to a planned multicast address.

The flow at a terminal side is described as follows.

A player may send a live stream request to a terminal proxy module to request the master m3u8.

The terminal proxy module may request the m3u8 added with the multicast information from the multicast control module at the server side, modify the salve m3u8 address in the m3u8 added with the multicast information to be a local address and transfer the local address to the player, parse the SDP information in the m3u8 added with the multicast information to obtain the multicast address, and transfer the multicast address to a multicast receiving module.

The multicast receiving module may join a multicast group, receive multicast data, and transfer the received multicast data to a multicast parsing module.

The multicast parsing module may parse out the updated m3u8 and the updated ts.

The terminal proxy module may return corresponding files that are parsed out to the player when the player requests an m3u8 and a ts, thereby realizing a play.

In an exemplary embodiment, to shorten the caching time waited by a player during a live stream, a media content file may be partitioned into smaller fragmentations during a multicast packing process. The play proxy module may start returning a media file to a local player once the fragmentations of a media content file are partially received in a multicast, thereby shortening the time consumed by the caching of a proxy.

Figure 9:
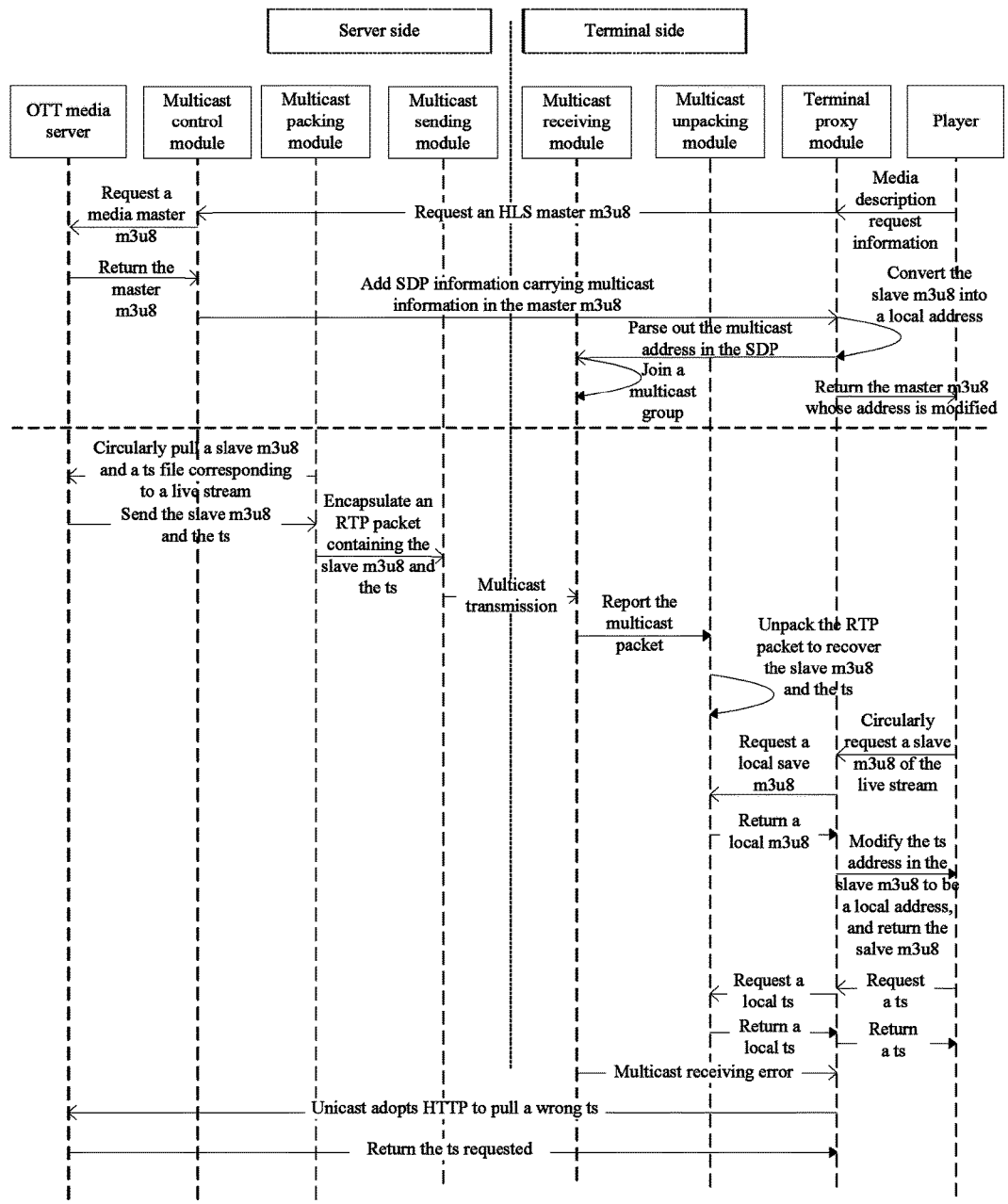
FIG. 9 is a flow chart schematically illustrating the multicast of an HLS live stream and a unicast-compensated play according to an optional implementation mode of embodiments of the disclosure.

FIG. 9 is a flow chart schematically illustrating the multicast of an HLS live stream and a unicast-compensated play according to an optional implementation mode of embodiments of the disclosure. As shown in FIG. 9, to give consideration to both the efficiency and the quality of a multicast transmission, a unicast may be started for compensation when a problem occurs in the multicast transmission. Aiming at a problem occurring in a multicast network, the incompletion of the data received for a multicast and the other problems, whether or not to perform a unicast compensation and which range the compensation is to be performed in may be determined according to a specified strategy. The specific flow may be substantially identical to the embodiment shown in FIG. 8 except that the multicast receiving module may report, when finding a receiving error, related information to the terminal proxy module, and the terminal proxy module may directly pull the wrong ts from the HLS server and compensate for the error through a unicast.

Figure 10:
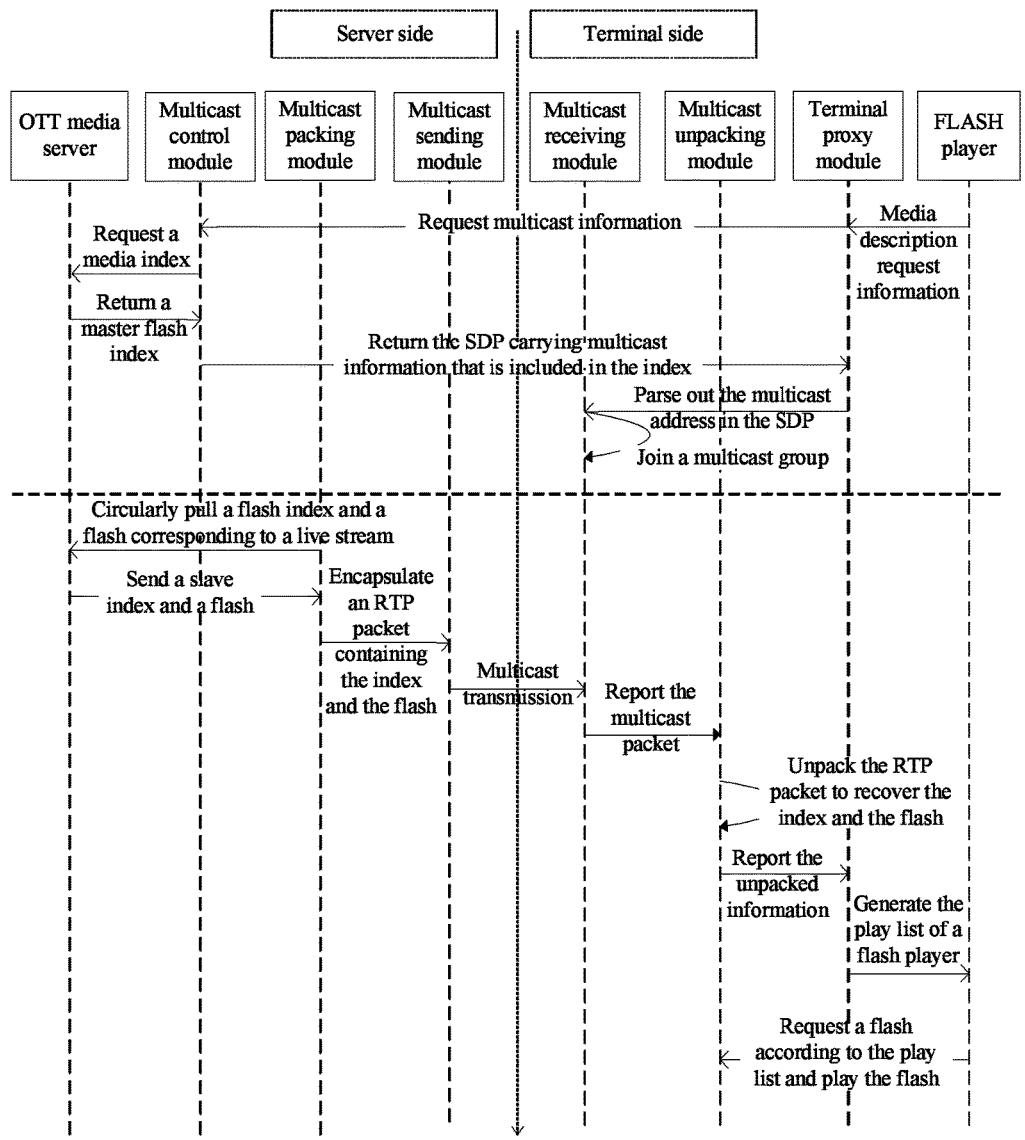
FIG. 10 is a flow chart schematically illustrating the play of the multicast of a FLASH live stream according to an optional implementation mode of embodiments of the disclosure.

FIG. 10 is a flow chart schematically illustrating the play of the multicast of a FLASH live stream according to an optional implementation mode of embodiments of the disclosure. As shown in FIG. 10, the flow may include the following acts.

A live stream may be achieved by transferring flash through multicast.

A single flash file may be generated based on a live stream content generated by a source station. At the same time, an index file may be generated to describe the sequential relationship among the flash files. The basic flow may be identical to the embodiment shown in FIG. 8 except that after receiving an index and a flash file, the terminal proxy may need to initiatively generate a flash play list according to the sequential relationship in the index and call the player of flash to play the flash file initiatively, thereby realizing a live stream based on the play of a flash file.

Based on the description of the foregoing embodiments and optional implementation modes thereof, those skilled in the art can clearly appreciate that the methods of the foregoing embodiments may be realized by means of software plus a universal hardware platform, and apparently, the methods of the foregoing embodiments may alternatively be realized by hardware. Based on this appreciation, the essence of technical solutions provided herein or the contribution made by the disclosure to related technologies may be embodied as a software product. The software product may be stored on a storage medium (e.g. an ROM/RAM, a diskette, an optical disc) and may include a plurality of instructions for causing a terminal device (e.g. a mobile phone, a computer, a server or a network device) to execute the methods described herein.

A storage medium is also provided in an embodiment of the disclosure. In an exemplary embodiment, the storage medium may be configured to store program codes for executing the acts of the methods described in foregoing embodiments.

In an exemplary embodiment, the storage medium provided may include, but is not limited to be: a USB flash disk, a Read-Only Memory (ROM), a Random Access Memory (RAM), a mobile hard disk drive, a diskette, an optical disc or other medium on which program codes can be stored.

In an exemplary embodiment, a processor may execute the acts of the methods described in the foregoing embodiments according to the program codes already stored in the storage medium.

It should be appreciated by those of ordinary skill in the art that the acts described in the foregoing embodiments may be wholly or partially executed through a computer program. The computer program may be stored on a computer-readable storage medium and may be executed on a corresponding hardware platform (e.g. system, device, apparatus, component, processor). The computer program, when being executed, may execute one of or a combination of the acts of methods described in the foregoing.

In an exemplary embodiment, all or a part of the acts of the foregoing embodiments may also embodied as integrated circuits. These acts may be separately embodied as integrated circuit modules, or more than one of the foregoing modules or acts may be embodied as a single integrated circuit module.

The apparatuses/functional modules/functional units described in the foregoing embodiments, which may be realized by a universal computing device, may be integrated on a single computing device or distributed on a network comprising a plurality of computing devices.

These apparatuses/functional modules/functional units described in the foregoing embodiments, when embodied as software function modules and sold or used as independent products, may be stored on a computer-readable storage medium. The computer-readable storage medium may be a read-only memory, a diskette, a compact disc, or the like.

It should be appreciated by those of ordinary skill in the art that various modifications and substitutes can be devised for the technical solutions of the disclosure without departing from the scope of the disclosure. The scope of the disclosure is defined based on appended claims.

INDUSTRIAL APPLICABILITY

In some embodiments of the disclosure, a terminal may send media description request information corresponding to OTT media to a multicast server; the terminal may receive media description information fed back by the multicast server based on the media description request information, wherein the media description information may include multicast information, and the multicast information may include multicast group information; and the terminal may receive a multicast packet from the multicast server according to the multicast group information, wherein the multicast packet may be generated by encapsulating a media index file corresponding to the media description request information and/or a media content file corresponding to the media description request information. By virtue of the solution, a problem that transmission of media streams consumes resources of a server tremendously may be addressed and the resource consumption of the server may be lowered.

What is claimed is:

1. A multicast transmission method for Over The Top (OTT) media, comprising:

sending, by a terminal, media description request information corresponding to OTT media to a multicast server;

receiving, by the terminal, media description information fed back by the multicast server based on the media description request information, wherein the media description information comprises multicast information, and the multicast information comprises multicast group information; and receiving, by the terminal, a multicast packet from the multicast server according to the multicast group information, wherein the multicast packet is generated by encapsulating a media index file corresponding to the media description request information and/or a media content file corresponding to the media description request information;

wherein the media description information comprises at least one of: a media index file address and a media content file address; and when the media description information comprises the media index file address, the method further comprises:

modifying, by the terminal, the media index file address of the terminal after the terminal joins a multicast group specified by the multicast information; and directing, by the terminal, the media index file of the multicast packet to a local media index file according to the local address; or when the media description information comprises the media content file address, the method further comprises:

modifying, by the terminal, the media content file address to be a local address of the terminal after the terminal joins a multicast group specified by the multicast information; and directing, by the terminal, the media content file to a local media content file according to the local address; or when the media description information comprises the media index file address and the media content file address, the method further comprises:

modifying, by the terminal, the media index file address and the media content file address to be a local address of the terminal after the terminal joins a multicast group specified by the multicast information; and directing, by the terminal, the media index file of the multicast packet to a local media index file according to the local address, and directing, by the terminal, the media content file to a local media content file according to the local address.

2. The method as claimed in claim 1, when the multicast packet is generated by encapsulating the media index file corresponding to the media description request information, the method further comprises: acquiring, by the terminal, the media index file corresponding to the multicast packet from a media server corresponding to the media description request information when the terminal is incapable of normally receiving the multicast packet from the multicast server according to the multicast group information; or when the multicast packet is generated by encapsulating the media content file corresponding to the media description request information, the method further comprises: acquiring, by the terminal, the media content file corresponding to the multicast packet from a media server corresponding to the media description request information when the terminal is incapable of normally receiving the multicast packet from the multicast server according to the multicast group information; or when the multicast packet is generated by encapsulating the media index file corresponding to the media description request information and the media content file corresponding to the media description request information, the method further comprises: acquiring, by the terminal, the media index file and the media content file corresponding to the multicast packet from a media server corresponding to the media description request information when the terminal is incapable of normally receiving the multicast packet from the multicast server according to the multicast group information.

3. The method as claimed in claim 2, wherein when the multicast packet is generated by encapsulating the media content file corresponding to the media description request information or when the multicast packet is generated by encapsulating the media index file corresponding to the media description request information and the media content file corresponding to the media description request information, the multicast packet is generated by encapsulating the media content file partitioned according to a preset fragmentation size threshold.

4. The method as claimed in claim 3, wherein when the multicast packet is generated by encapsulating the media index file corresponding to the media description request information and the media content file corresponding to the media description request information, the media index file comprises a sequential relationship among media content files.

5. The method as claimed in claim 1, wherein when the multicast packet is generated by encapsulating the media content file corresponding to the media description request information or when the multicast packet is generated by encapsulating the media index file corresponding to the media description request information and the media content file corresponding to the media description request information, the multicast packet is generated by encapsulating the media content file partitioned according to a preset fragmentation size threshold.

6. The method as claimed in claim 5, wherein when the multicast packet is generated by encapsulating the media index file corresponding to the media description request information and the media content file corresponding to the media description request information, the media index file comprises a sequential relationship among media content files.

7. The method as claimed in claim 1, wherein when the multicast packet is generated by encapsulating the media index file corresponding to the media description request information and the media content file corresponding to the media description request information, the media index file comprises a sequential relationship among media content files.

8. A multicast transmission method for Over The Top (OTT) media, comprising:

receiving, by a multicast server, media description request information corresponding to OTT media from a terminal;

sending, by the multicast server, media description information corresponding to the media description request information to the terminal, wherein the media description information comprises multicast information, and the multicast information comprises multicast group information;

sending, by the multicast server, a multicast packet to the terminal, wherein the multicast packet is generated by encapsulating a media index file corresponding to the media description request information and/or a media content file corresponding to the media description request information;

wherein the media description information comprises at least one of: a media index file address and a media content file address; and when the media description information comprises the media index file address, the method further comprises:

modifying, by the terminal, the media index file address of the terminal after the terminal joins a multicast group specified by the multicast information; and directing, by the terminal, the media index file of the multicast packet to a local media index file according to the local address; or when the media description information comprises the media content file address, the method further comprises:

modifying, by the terminal, the media content file address to be a local address of the terminal after the terminal joins a multicast group specified by the multicast information; and directing, by the terminal, the media content file to a local media content file according to the local address; or when the media description information comprises the media index file address and the media content file address, the method further comprises:

modifying, by the terminal, the media index file address and the media content file address to be a local address of the terminal after the terminal joins a multicast group specified by the multicast information; and directing, by the terminal, the media index file of the multicast packet to a local media index file according to the local address, and directing, by the terminal, the media content file to a local media content file according to the local address.

9. The method as claimed in claim 8, wherein
when the multicast packet is generated by encapsulating the media index file corresponding to the media description request information, before sending, by the multicast server, the multicast packet to the terminal, the method further comprises: acquiring the media index file from a media server according to the media description request information; or when the multicast packet is generated by encapsulating the media content file corresponding to the media description request information, before sending, by the multicast server, the multicast packet to the terminal, the method further comprises: acquiring the media content file from a media server according to the media description request information; or when the multicast packet is generated by encapsulating the media index file corresponding to the media description request information and the media content file corresponding to the media description request information, before sending, by the multicast server, the multicast packet to the terminal, the method further comprises: acquiring the media index file and the media content file from a media server according to the media description request information.

10. The method as claimed in claim 9, wherein
when the multicast packet is generated by encapsulating the media content file corresponding to the media description request information, or when the multicast packet is generated by encapsulating the media index file corresponding to the media description request information and the media content file corresponding to the media description request information, the multicast packet is generated by encapsulating the media content file partitioned according to a preset fragmentation size threshold.

11. The method as claimed in claim 10, wherein
when the multicast packet is generated by encapsulating the media index file corresponding to the media description request information and the media content file corresponding to the media description request information, the media index file comprises a sequential relationship among media content files.

12. The method as claimed in claim 8, wherein
when the multicast packet is generated by encapsulating the media content file corresponding to the media description request information, or when the multicast packet is generated by encapsulating the media index file corresponding to the media description request information and the media content file corresponding to the media description request information, the multicast packet is generated by encapsulating the media content file partitioned according to a preset fragmentation size threshold.

13. The method as claimed in claim 12, wherein
when the multicast packet is generated by encapsulating the media index file corresponding to the media description request information and the media content file corresponding to the media description request information, the media index file comprises a sequential relationship among media content files.

14. A multicast transmission apparatus for Over The Top (OTT) media located in a terminal, comprising:
a first sending module, configured to send media description request information corresponding to OTT media to a multicast server;
a first receiving module, configured to receive media description information fed back by the multicast server based on the media description request information, wherein the media description information comprises multicast information, and the multicast information comprises multicast group information; and
a second receiving module, configured to receive, according to the multicast group information, a multicast packet from the multicast server, wherein the multicast packet is generated by encapsulating a media index file corresponding to the media description request information and/or a media content file corresponding to the media description request information;
wherein the media description information comprises at least one of: a media index file address and a media content file address; and
when the media description information comprises the media index file address, the terminal is further configured to:
modify the media index file address of the terminal after the terminal joins a multicast group specified by the multicast information; and
direct the media index file of the multicast packet to a local media index file according to the local address; or
when the media description information comprises the media content file address, the terminal is further configured to:
modify the media content file address to be a local address of the terminal after the terminal joins a multicast group specified by the multicast information; and
direct the media content file to a local media content file according to the local address; or
when the media description information comprises the media index file address and the media content file address, the terminal is further configured to:
modify the media index file address and the media content file address to be a local address of the terminal after the terminal joins a multicast group specified by the multicast information; and
direct the media index file of the multicast packet to a local media index file according to the local address, and directing, by the terminal, the media content file to a local media content file according to the local address.

15. A multicast transmission apparatus for Over The Top (OTT) media located in a multicast server, comprising:
a third receiving module, configured to receive the media description request information corresponding to OTT media from a terminal;
a second sending module, configured to send media description information corresponding to the media description request information to the terminal, wherein the media description information comprises multicast information, and the multicast information comprises multicast group information; and
a third sending module, configured to send a multicast packet to the terminal, wherein the multicast packet is generated by encapsulating a media index file corresponding to the media description request information and/or a media content file corresponding to the media description request information;
wherein the media description information comprises at least one of: a media index file address and a media content file address; and
when the media description information comprises the media index file address, the terminal is configured to:
modify the media index file address of the terminal after the terminal joins a multicast group specified by the multicast information; and direct the media index file of the multicast packet to a local media index file according to the local address; or when the media description information comprises the media content file address, the terminal is configured to:

modify the media content file address to be a local address of the terminal after the terminal joins a multicast group specified by the multicast information; and direct the media content file to a local media content file according to the local address; or when the media description information comprises the media index file address and the media content file address, the terminal is configured to:

modify the media index file address and the media content file address to be a local address of the terminal after the terminal joins a multicast group specified by the multicast information; and direct the media index file of the multicast packet to a local media index file according to the local address, and directing, by the terminal, the media content file to a local media content file according to the local address.

16. A multicast transmission system for Over The Top (OTT) media, comprising: a terminal comprising a multicast transmission apparatus for OTT media and a multicast server comprising the multicast transmission apparatus for OTT media as claimed in claim 11, wherein, the terminal comprises: a first sending module, configured to send media description request information corresponding to OTT media to a multicast server; a first receiving module, configured to receive media description information fed back by the multicast server based on the media description request information, wherein the media description information comprises multicast information, and the multicast information comprises multicast group information; and a second receiving module, configured to receive, according to the multicast group information, a multicast packet from the multicast server, wherein the multicast packet is generated by encapsulating a media index file corresponding to the media description request information and/or a media content file corresponding to the media description request information;

wherein the media description information comprises at least one of: a media index file address and a media content file address; and when the media description information comprises the media index file address, the terminal is further configured to:

modify the media index file address of the terminal after the terminal joins a multicast group specified by the multicast information; and direct the media index file of the multicast packet to a local media index file according to the local address; or when the media description information comprises the media content file address, the terminal is further configured to:

modify the media content file address to be a local address of the terminal after the terminal joins a multicast group specified by the multicast information; and direct the media content file to a local media content file according to the local address; or when the media description information comprises the media index file address and the media content file address, the terminal is further configured to:

modify the media index file address and the media content file address to be a local address of the terminal after the terminal joins a multicast group specified by the multicast information; and direct the media index file of the multicast packet to a local media index file according to the local address, and directing, by the terminal, the media content file to a local media content file according to the local address.

17. A non-transitory computer-readable storage medium, wherein computer-executable instructions which, when being executed, realize the multicast transmission method for OTT media as claimed in claim 1 are stored on the computer-readable storage medium.

18. A non-transitory computer-readable storage medium, wherein computer-executable instructions which, when being executed, realize the multicast transmission method for OTT media as claimed in claim 8 are stored on the computer-readable storage medium.

* * * * *